(12) United States Patent
Meyers et al.

(10) Patent No.: US 7,350,843 B2
(45) Date of Patent: Apr. 1, 2008

(54) TAILGATE RAMP SYSTEM

(75) Inventors: Thomas Joseph Meyers, Greenwood, IN (US); Paul Thomas Zink, Indianapolis, IN (US); Trevor Scott Brown, Salem, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 11/672,466

(22) Filed: Feb. 7, 2007

(65) Prior Publication Data

US 2007/0182192 A1    Aug. 9, 2007

Related U.S. Application Data

(60) Provisional application No. 60/743,246, filed on Feb. 7, 2006.

(51) Int. Cl.
*B65G 69/28*    (2006.01)

(52) U.S. Cl. .......................... 296/50; 14/69.5

(58) Field of Classification Search .................. 296/50, 296/57.1, 61; 14/69.5, 71.1; 414/537
See application file for complete search history.

(56) References Cited

U.S. PATENT DOCUMENTS

| | | | |
|---|---|---|---|
| 1,100,170 A | | 6/1914 | Brosius |
| 3,510,015 A | * | 5/1970 | Roshaven .................. 414/537 |
| 3,517,791 A | | 6/1970 | Miles |
| 4,478,549 A | | 10/1984 | Stelly et al. |
| 4,571,144 A | * | 2/1986 | Guidry et al. ............... 414/537 |
| 4,727,612 A | | 3/1988 | Smith |
| 4,853,999 A | | 8/1989 | Smith |
| 5,325,558 A | | 7/1994 | Labreche |
| 5,340,266 A | * | 8/1994 | Hodgetts .................... 414/527 |
| 5,481,773 A | | 1/1996 | Alten |
| 5,538,308 A | | 7/1996 | Floe |
| 5,540,474 A | * | 7/1996 | Holland ....................... 296/61 |
| 5,608,937 A | | 3/1997 | Seigneur et al. |
| 5,768,733 A | | 6/1998 | Kneebone |
| 5,926,899 A | | 7/1999 | Scott |
| 5,938,397 A | | 8/1999 | Schouest |
| 5,993,135 A | | 11/1999 | Wolgamood |
| 6,139,249 A | | 10/2000 | Lucht |
| 6,267,082 B1 | * | 7/2001 | Naragon et al. ............ 119/849 |
| 6,269,508 B1 | | 8/2001 | Younce |
| 6,389,629 B1 | | 5/2002 | Schouest |
| 6,447,040 B1 | * | 9/2002 | Young, Sr. ................... 296/61 |
| 6,520,523 B2 | | 2/2003 | Beck |
| 6,536,064 B1 | | 3/2003 | Swink et al. |
| 6,575,516 B2 | | 6/2003 | Webber |
| 6,592,135 B2 | | 7/2003 | Hendrix |
| 6,634,849 B2 | | 10/2003 | Clary |
| 6,643,878 B2 | | 11/2003 | Schmaltz et al. |
| 6,701,563 B2 | | 3/2004 | Schomaker et al. |
| 6,811,067 B2 | | 11/2004 | Muizelaar et al. |
| 6,837,669 B2 | | 1/2005 | Reed et al. |
| 6,868,574 B2 | | 3/2005 | Schomaker et al. |

(Continued)

*Primary Examiner*—Hilary Gutman
(74) *Attorney, Agent, or Firm*—Barnes & Thornburg LLP (57) ABSTRACT

A tailgate ramp system for use with a loading ramp. The tailgate ramp system is used to support one end of the loading ramp on the tailgate of a motor vehicle. The tailgate ramp system includes a tailgate adapter having a tailgate mount adapted to lie on a portion of the tailgate and a ramp support adapted to be coupled to one end of the loading ramp and to the tailgate mount.

24 Claims, 9 Drawing Sheets

U.S. PATENT DOCUMENTS

| | | |
|---|---|---|
| 6,887,028 B1 | 5/2005 | Kirla, Jr. |
| 7,111,885 B1 * | 9/2006 | Hoffmann et al. ....... 296/26.11 |
| 2002/0088065 A1 | 7/2002 | Schmaltz et al. |
| 2003/0039534 A1 | 2/2003 | Radosevich et al. |
| 2003/0072641 A1 | 4/2003 | Reed et al. |
| 2003/0145398 A1 | 8/2003 | Schomaker et al. |
| 2003/0229954 A1 | 12/2003 | Lucht |
| 2004/0083562 A1 | 5/2004 | Leblanc |
| 2004/0143915 A1 | 7/2004 | Schomaker et al. |

* cited by examiner

TAILGATE RAMP SYSTEM

This application claims priority under 35 U.S.C. § 119(e) to U.S. Provisional Application Ser. No. 60/743,246, filed Feb. 7, 2006, which is expressly incorporated by reference herein.

BACKGROUND

The present disclosure relates to loading ramps, and, in particular, to adapters for use with planks used as loading ramps. More particularly, the present disclosure relates to ramp adapters for connecting one or more loading ramps to a motor vehicle.

Loading ramps typically are used in sets to assist in loading objects, such as lawn tractors, all-terrain vehicles (ATV's), and motorcycles from a ground level surface into the bed of a motor vehicle or other elevated surface. A loading ramp can be used to provide an inclined surface extending from a tailgate to the ground under the tailgate.

A tailgate ramp system, in accordance with the present disclosure, is adapted to be coupled to a plank intended to be used as a loading ramp. The tailgate ramp system, when used in combination with the plank, provides an inclined surface to permit the loading and unloading of a motor vehicle or other elevated load bearing surface.

In illustrative embodiments, the tailgate ramp system includes a tailgate adapter having a tailgate mount adapted to engage the tailgate of a motor vehicle or load bearing surface. The tailgate adapter also includes a ramp support adapted to be coupled to one end of the loading ramp and an intermediate member interconnecting the tailgate mount to the ramp support. The tailgate ramp system also includes a tether used to secure the tailgate adapter to the tailgate of the motor vehicle to prevent unintentional disconnection of the loading ramp from the motor vehicle during use of the ramp.

In illustrative embodiments, the tailgate ramp system also includes a mid-ramp adapter that is positioned at the mid-section of a loading ramp having upper and lower planks. The mid-ramp adapter includes a first plank support that is adapted to be coupled to the upper plank and a second plank support that is adapted to be coupled to the lower plank of the loading ramp. The mid-ramp adapter also includes a plank separator positioned to lie between the first and second plank supports. The mid-ramp adapter reduces the transition angle between the loading ramp and the tailgate of the motor vehicle to permit loading of objects with low ground clearance.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIGS. 12-15 show a tailgate ramp system in accordance with another embodiment of the disclosure;

FIGS. 16-18 show a mid-ramp adapter in accordance with another embodiment of the disclosure;

DETAILED DESCRIPTION

Figure 1:
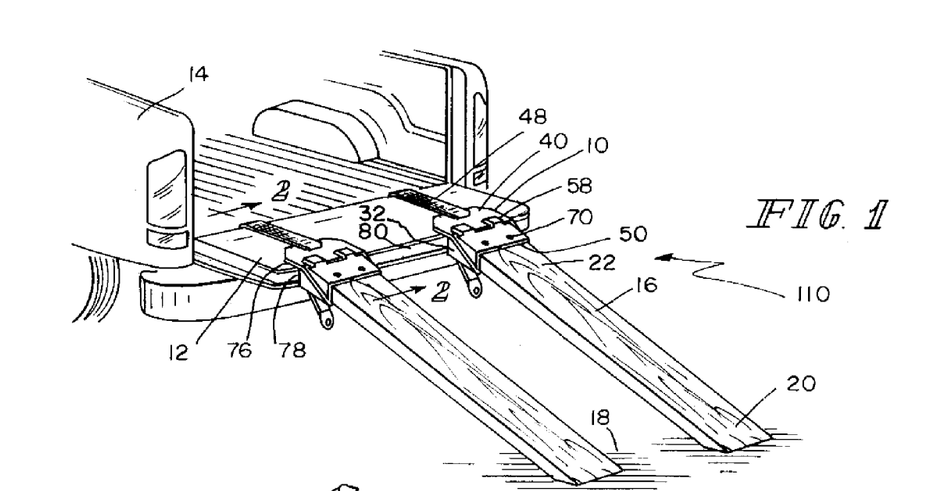
FIG. 1 is a perspective view of a pair of tailgate adapters securing a pair of loading ramp planks to an open tailgate of a motor vehicle, wherein the position of the tailgate adapters is maintained by use of a pair of straps secured around the tailgate.
Figure 2:
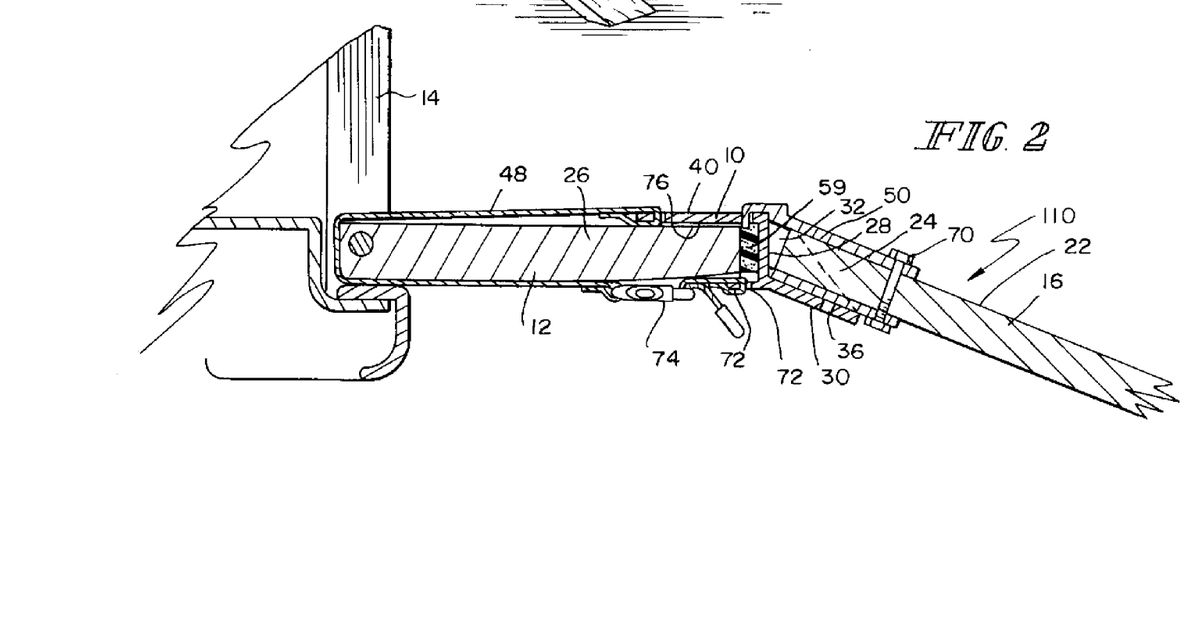
FIG. 2 is a cross sectional view of the left tailgate adapter taken along sectional lines 2-2 of FIG. 1 illustrating the connection of the loading ramp to the tailgate adapter and the tailgate adapter to the tailgate of the motor vehicle.

A tailgate ramp system 110, in accordance with the present disclosure, includes one or more tailgate adapters 10, that can be configured to secure a loading ramp 16 to an elevated load bearing surface such as, for example, the tailgate 12 of a motor vehicle 14, a loading dock, or other structure, as shown, for example, in FIGS. 1 and 2. Loading ramp 16, when secured to tailgate adapter 10, is configured to span the distance between a ground level surface 18 and the load bearing surface of a motor vehicle 14 or other structure, as shown, for example, in FIG. 1. Tailgate ramp systems 110, 110', 110", 210, and 210' in accordance with other embodiments of the present disclosure are shown, for example, in FIG. 4, FIGS. 5-7, FIGS. 12-15, and FIGS. 16-18.

In illustrative embodiments, tailgate adapter 10 includes a ramp mount 24 and a tailgate mount 26 as shown, for example, in FIG. 2. Ramp mount 24 and tailgate mount 26 are joined by common wall member 28. Ramp mount 24 of tailgate adapter 10 is configured to be secured to upper end 22 of loading ramp 16. Lower end 20 of loading ramp 16 is supported by ground level surface 18.

Ramp mount 24 includes a base member 30 that extends outwardly from wall member 28. Base member 30 is designed to support loading ramp 16. Ramp mount 24 also includes a pair of opposed side walls 32, 34 that are secured to base member 30 and wall member 28. Wall member 28, base member 30, and side walls 32, 34 together form ramp mount 24.

Figure 3:
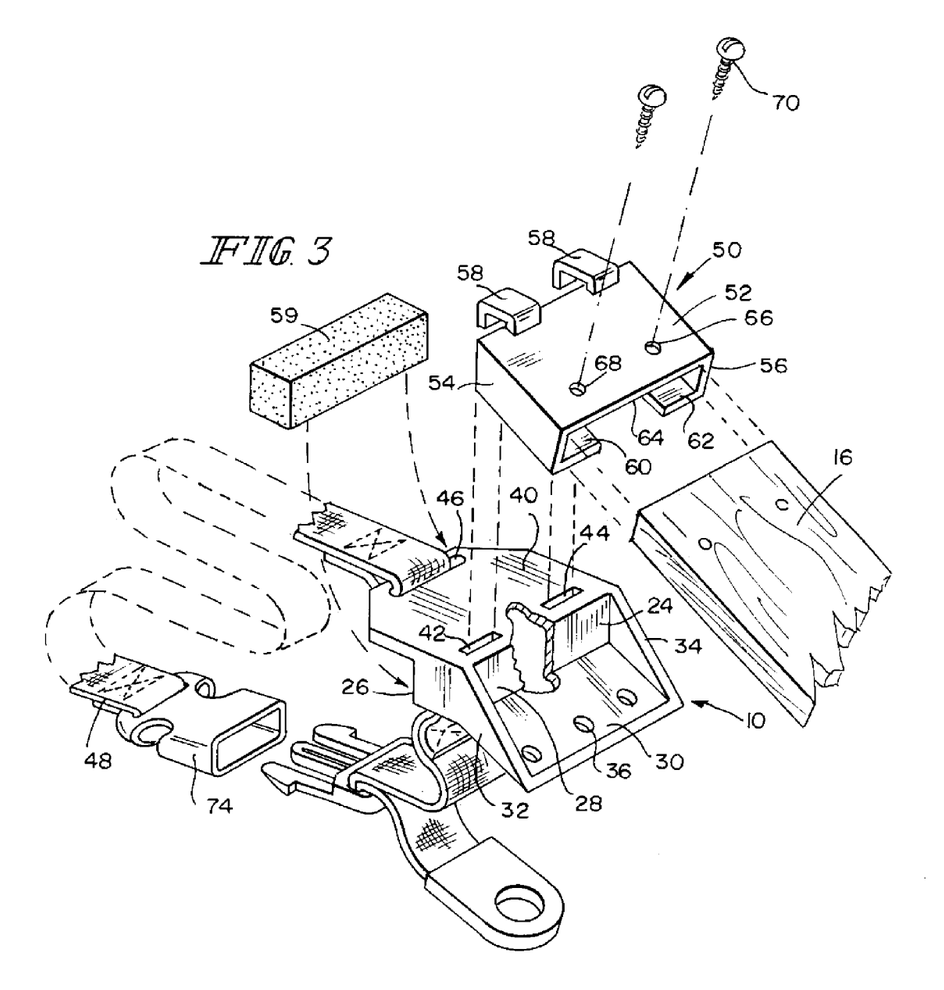
FIG. 3 is an exploded prospective view of the components including an illustrative embodiment of the tailgate adapter in accordance with the present disclosure, which includes a ramp engagement member adapted to be attached to the end of the loading ramp to allow the ramp to be releasably secured to the tailgate adapter.

Tailgate adapter 10 can be used with a ramp engagement member 50 to allow loading ramps 16 to be removably secured to ramp mount 24 of tailgate adapter 10, as shown, for example, in FIG. 3. Ramp engagement member 50 includes a top wall 52 connected to a pair of opposed side walls 54, 56, as shown, for example, in FIG. 3.

Top wall 52 of ramp engagement member 50 includes a pair of retainers 58 that are arranged to allow releasable attachment of ramp engagement member 50 with tailgate adapter 10. By using the ramp engagement member, tailgate adapters 10 do not need to be removed from tailgate 12 when loading ramps 16 are not in use.

Ramp engagement member 50 also includes a pair of wall sections 60, 62 that extend inwardly from side walls 54, 56. Walls 52, 54, 56, 60, and 62 cooperate to form a receptacle 64 to retain upper end 22 of loading ramp 16. Top wall 52 of ramp engagement member 50 includes apertures 66, 68 that are adapted to accept fasteners 70 to secure upper end 22 of loading ramp board 16 to ramp engagement member 50.

Figures 8, 9, 10:
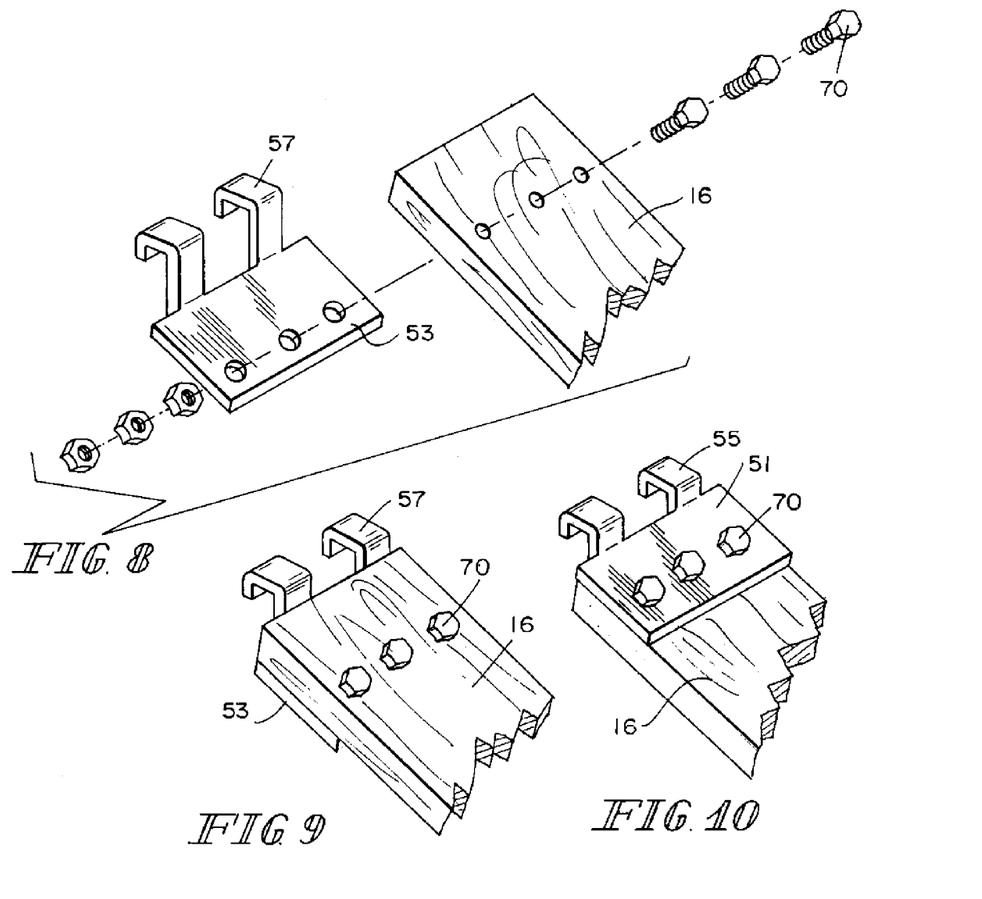
FIGS. 8-10 are perspective views of various ramp engagement members that can be secured to the ramp to allow releasable connection of the ramps to the tailgate adapter.

Alternate configurations of ramp engagement member 50 can be used to secure ramp boards 16, as shown, for example, in FIG. 8. These can include plates 51, 53 having retainers 55, 57 that are secured the boards 16 by use of fasteners 70. In another illustrative embodiment, loading ramp boards 16 are bolted directly to base member 30 by securing fasteners 70 to apertures 36 of base member 30, as shown, for example, in FIG. 7.

Base member 30 of tailgate adapter 10 includes a bracket 72 that is adapted to accept a portion of a securing strap 48, as shown, for example, in FIG. 2. Securing strap 48, in one embodiment, includes a snap buckle 74 that allows strap 48 to be releasably secured around tailgate 12 of motor vehicle 14 to secure tailgate adapter 10. Snap buckle 74 allows slack in securing strap 48 to be taken up when connecting strap 48 to tailgate 12. While a releasable snap buckle 74 is shown, it is contemplated that other securing means can be used to secure strap 48 including ratchet mechanisms 75, cam devices and other strap securing devices, as shown, for example, in FIG. 7.

Tailgate mount 26 of tailgate adapter 10 includes a support member 40 that is extends outwardly from wall member 28, as shown, for example, in FIGS. 2 and 3. Support member 40 is secured to side walls 32, 34. Support member 40 includes a bottom surface 76 that is adapted to be positioned against tailgate 12 of motor vehicle 14 or other load bearing surface.

Bottom surface 76 of the support member 40 may include foam or other material to prevent marring of vehicle tailgate 12. Side walls 32, 34 include leading edges 78 that are adapted to engage side surface 80 of tailgate 12. Leading edges 78 may include bumpers (not shown) to prevent marring of tailgate 12.

Tailgate mount 26 may also include a pad member 59, as shown, for example, in FIGS. 2 and 3. Support member 40 includes a pair of slots 42, 44 positioned adjacent wall member 28. Slots 42, 44 are configured to accept retainers 58 of ramp engagement member 50 to secure ramp engagement member 50 to tailgate adapter 10. Support member 40 also includes a slot 46 that is used to secure the second end of the strap 48 to support member 40.

Figure 4:
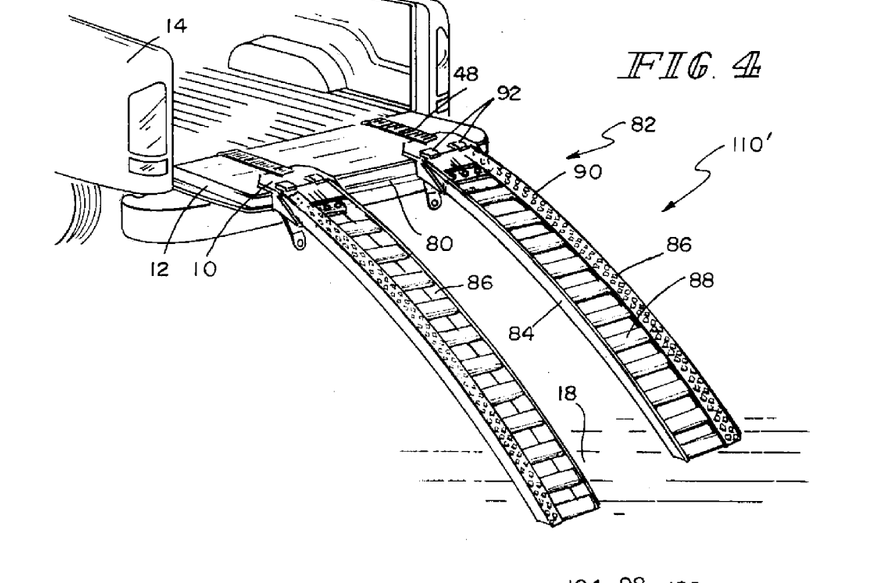
FIG. 4 is a perspective view of a pair of tailgate adapters securing a pair of metallic loading ramps to an open tailgate of a motor vehicle, wherein the loading ramps can be removed from the tailgate adapters without removing the tailgate adapters from the tailgate of the motor vehicle.

In another illustrative embodiment, aluminum loading ramps 82 may be used with the tailgate ramp system 110 in place of the wooden loading ramp boards 16, as shown, for example, in FIG. 4. Aluminum loading ramps 82 include a pair of side rails 84, 86 that are interconnected by a plurality of bridge members 88. Loading ramps 82, at an upper end 90, include a pair of retainers 92 that are adapted to engage slots 42, 44 of tailgate adapter 10.

Side rails 84, 86 of loading ramps 82 are supported by base member 30 of tailgate adapter 10. This arrangement permits loading ramps 82 to be disconnected from the tailgate adapter 10 quickly without the need for tools. Once loading ramps 82 are removed from tailgate adapter 10, tailgate 12 of motor vehicle 14 can be pivoted upward to a closed position without requiring the removal of tailgate adapter 10.

In use, tailgate adapters 10 are positioned on tailgate 12 of motor vehicle 12 so that bottom surface 76 of support member 40 and leading edges 78 of walls 32, 34 engage edge 80 of tailgate 12 and the bottom surface 76 of support member 40 engages top surface of tailgate 12. Once tailgate adapters 10 are in position, straps 48 are passed around tailgate 12 and secured within snap buckle 74 to secure tailgate adapters 10 to tailgate 12. Once tailgate adapters 10 are secured to tailgate 12, loading ramps 16 with ramp engagement members 50 or aluminum loading ramps 82 are positioned on the base member 30 of tailgate adaptor 10.

When the loading ramps are in their proper position, retainers 58 of the board engagement member 50 or retainers 92 of aluminum loading ramps 82 are positioned within slots 42, 44 of the support member 40. With loading ramps 16, 82 in position, items such as ATV's, lawn tractors, motorcycles, and the like can be either driven or otherwise transported up loading ramps 16 into the bed of motor vehicle 14.

Once loading is completed, loading ramps 16, 82 can be removed from tailgate adapters 10 and placed within the bed of motor vehicle 14. With ramps 16, 82 disconnected from tailgate adapters 10, tailgate adapters 10 may be removed from tailgate 12 by releasing strap 48 or, alternatively, can remain secured to tailgate 12 so that they are ready for future use.

The height differentiation between the ground level surface 18 and the tailgate 12 of the motor vehicle 14 creates an angular transition issue when loading ramps are used to bridge the distance between ground level surface 18 and tailgate 12. An issue arises when loading machinery with low ground clearance, such as a lawn tractor with mowing deck attached. Often times the deck of the tractor will snag the edge of the tailgate as well as the top of the loading ramps. To lessen the likelihood of snagging or catching the top of the ramps and the edge of the tailgate, aluminum ramps can be arched to reduce the transition angle between the horizontal loading surface and the inclined ramp structure, as shown, for example, in FIG. 4.

While aluminum loading ramps can be arched, wooden planks cannot without great effort. To reduce the transition angle between the horizontal load bearing surface of motor vehicle 14 and loading ramp 94, a mid-ramp adapter 96 can be used, as shown, for example, in FIGS. 5 and 6. Mid-ramp adapter 96 is configured to be positioned in the mid-portion of loading ramp 94 to create a slight angle in the center of loading ramp 94.

Figures 5, 6:
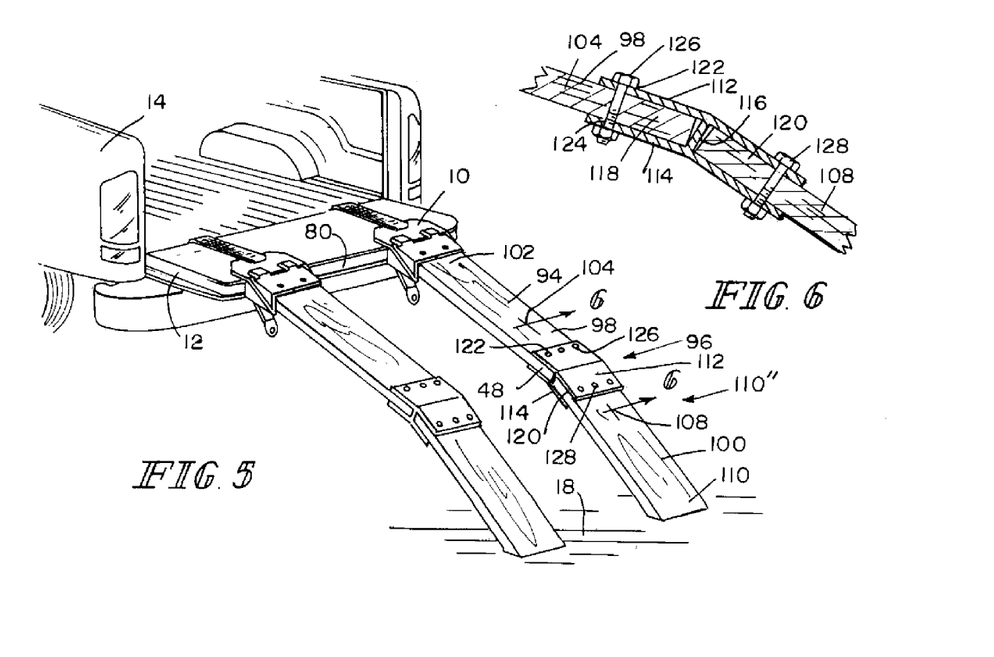
FIG. 5 is a perspective view similar to FIG. 1 but includes a pair of mid-ramp adapters secured to a pair of planks at their mid-section and are arranged to decrease the transition angle between the elevated loading surface and the loading ramps.
FIG. 6 is a cross sectional view of the mid-ramp adapter taken along sectional lines 6-6 of FIG. 5 illustrating the connection of the mid-ramp adapter to an upper plank and a lower plank.
Figure 7:
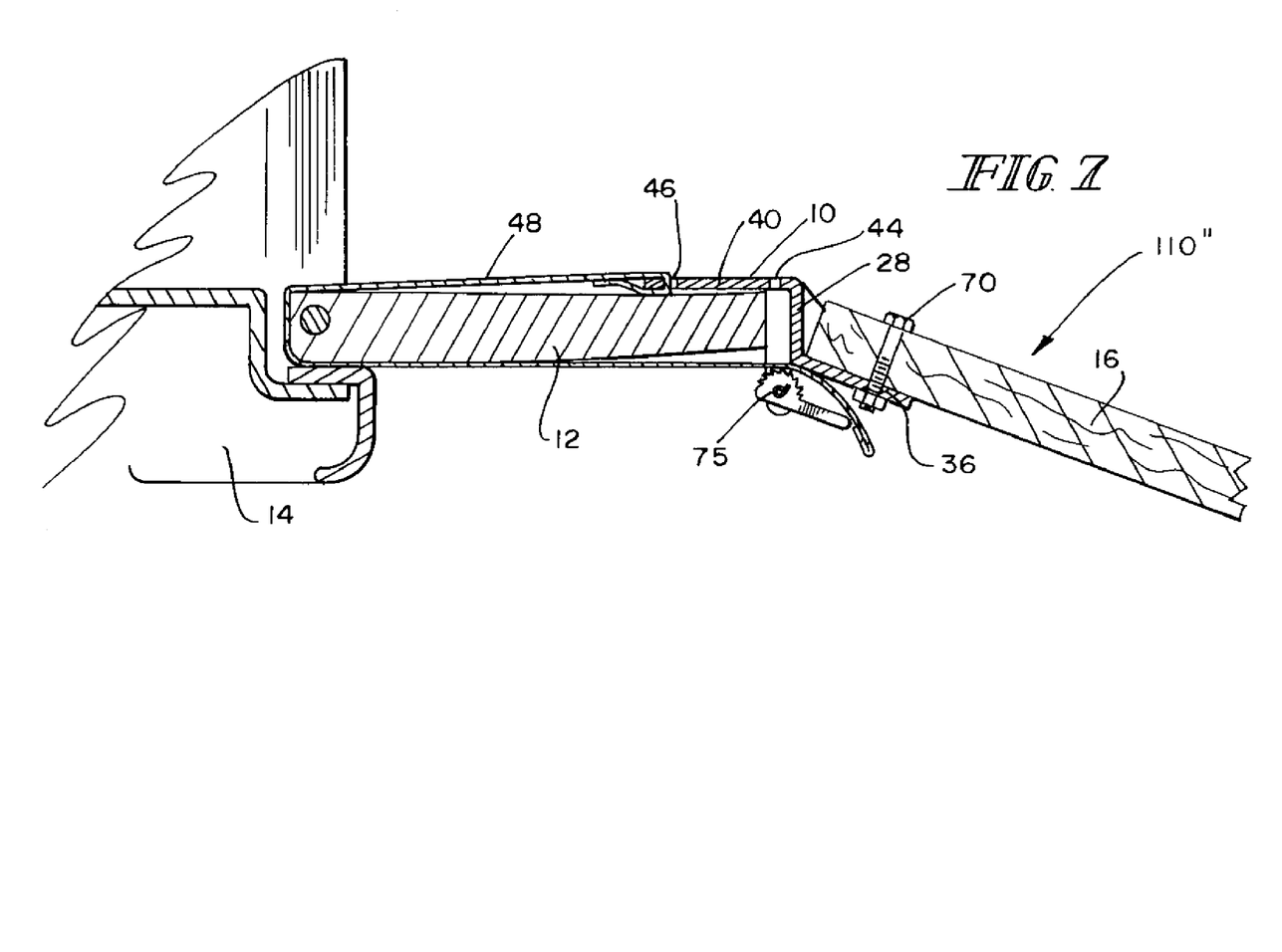
FIG. 7 is a view similar to FIG. 3 showing the ramp plank secured directly to the tailgate adapter and the use of a ratchet type strap retaining device.

Mid-ramp adapter 96 is adapted to be connected to an upper plank 98 and a lower plank 100 of loading ramp 94. Upper plank 98 includes a first end 102 and a spaced apart second end 104. First end 102 of upper plank 98 is adapted to be connected to tailgate adapter 10 and second end 104 is adapted to be connected to mid-ramp adapter 96. Lower plank 100 also includes a first end 108 and a spaced apart second end 110.

Second end 110 of lower plank 100 is adapted to be positioned adjacent ground level surface 18 and first end 108 is adapted to be connected to mid-ramp adapter 96. Mid-ramp adapter 96 is preferably made from steel but can be manufactured from other materials sufficiently strong enough to withstand the forces exerted on loading ramp 94, such as extruded aluminum.

Mid-ramp adapter 96 includes an upper plate 112 and a lower plate 114, as shown, for example, in FIG. 6. Upper and lower plates 112, 114 are separated by wall member 116. The orientation of plates 112, 114, in combination with wall member 116, creates a first opening 118 and an opposed second opening 120. First opening 118 of mid-ramp adapter 96 is adapted to accept second end 104 of upper plank 98.

Second opening 120 of mid-ramp adapter 96 is adapted to accept first end 108 of lower plank 100. Upper and lower plates 112, 114 of mid ramp adapter 96 include apertures 122, 124. Apertures 122 on upper plate 112 are aligned with apertures 124 on lower plate 114 so that fasteners 126 can pass from upper plate 112 through loading ramp 94 to lower plate 114. Upper and lower plates 112, 114 are both angled at wall member 116 to create an overall angle in loading ramp 94. First and second openings 118, 120 are designed to engage and compress against ends 104, 108 of loading ramp 94 when fasteners 126 are tightened.

Figure 11:
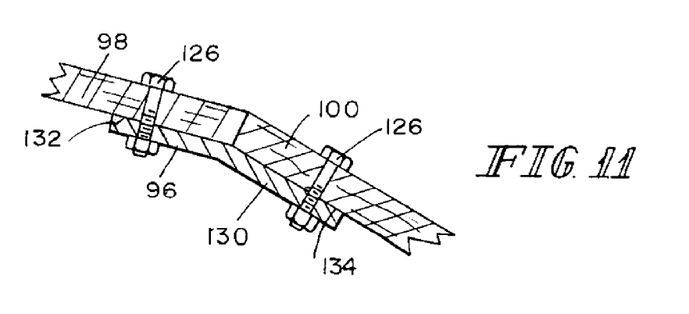
FIG. 11 is a cross sectional view similar to FIG. 6 showing a mid-ramp adapter that does not include a top plate.

In another illustrative embodiment, mid-ramp adapter 96 can include an angled lower plate 130 having a first half 132 and a second half 134, as shown, for example, in FIG. 11. First half 132 is connected to upper plank 98 and second half 134 is connected to the lower plank 100.

In use, a wooden plank is selected and cut at its mid-section to create upper and lower planks, 98, 100. First end 102 of upper plank 98 is secured to tailgate adapter 106 by use of fasteners 128. Second end 104 of upper plank 98 is secured within first opening 118 of mid ramp adapter 96 by use of fasteners 126.

Tightening of fasteners 126 compresses portions of upper and lower plates 112, 114 against second end 104 of upper plank 98. Once upper plank 98 is connected to mid-ramp adapter 96, first end 108 of lower plank 100 is inserted into second opening 120 of mid-ramp adapter 96. Once the first end 108 of lower plank 100 is positioned within second opening 120, fasteners 126 are installed. As fasteners 126 are tightened upper and lower plate sections 112, 114 compress against first end 108 of lower plank 100.

Once lower plank 100 is connected to mid-ramp adapter 96, loading ramp 94 is ready for use. When using loading ramp 94, tailgate adapter 101 is positioned on tailgate of a motor vehicle or other load bearing surface and second end 110 of lower plank 100 is placed upon the ground level surface 18 to permit loading and unloading of the motor vehicle.

A tailgate ramp system 210 in accordance with another embodiment of the present disclosure is disclosed in FIGS. 12-15. Tailgate ramp system 210 includes a ramp holder 208 configured to mount on a tailgate 216 of vehicle 218 and a pair of loading ramps 214 configured to engage ramp holder 208. In an illustrative embodiment, each loading ramp 214 is defined by a wooden plank or board as suggested in FIG. 12. Planks made of metal and/or plastics materials could also be used.

Figures 12, 13:
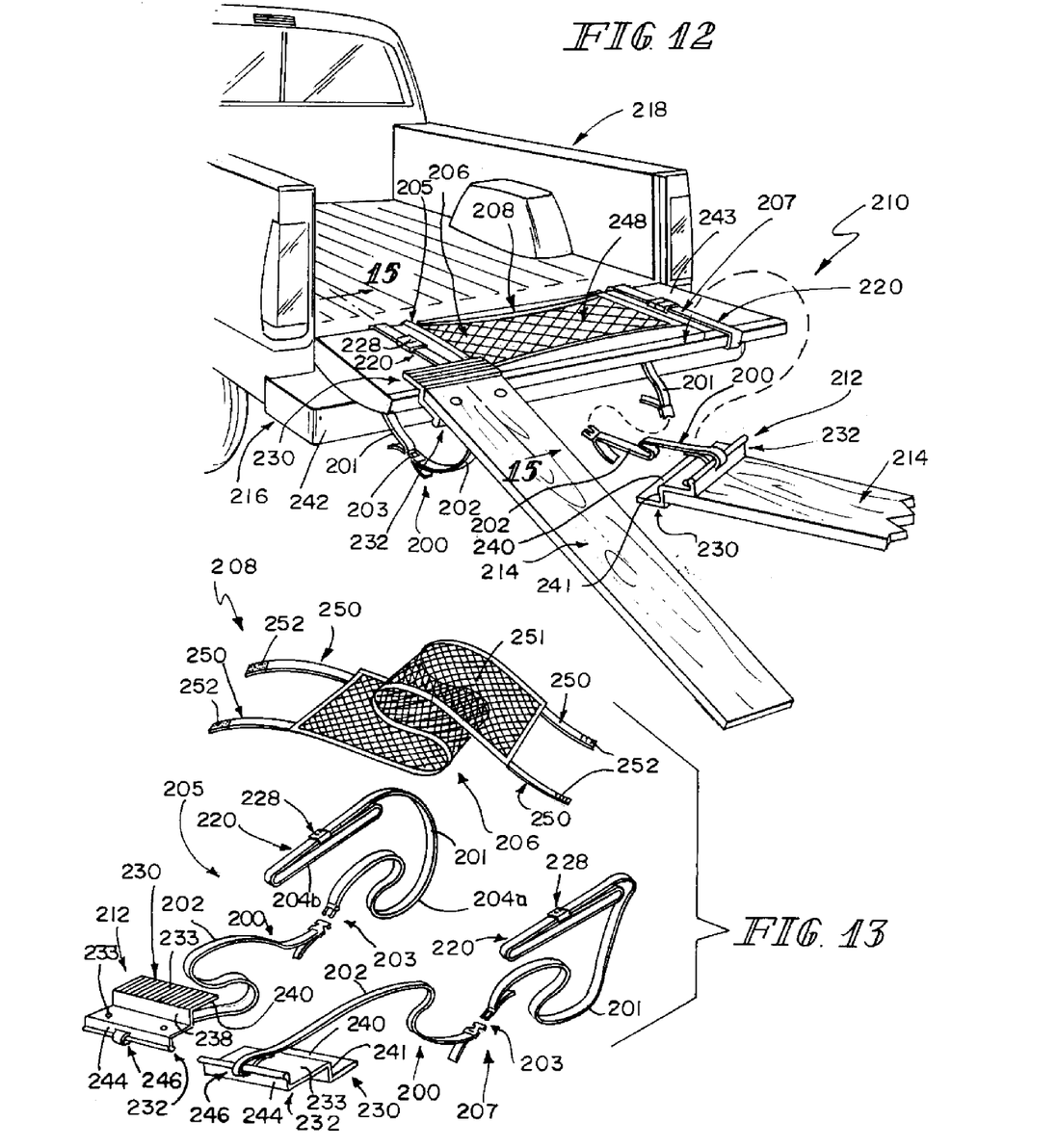
FIG. 12 is a perspective view of the tailgate ramp system showing a ramp holder including a pair of tailgate adapters securing a pair of loading ramps to an open tailgate of a motor vehicle, wherein the position of the tailgate adapters is maintained by use of a pair of tethers coupled to the tailgate by a pair of tether retainers, and also showing a accessory storage unit positioned between the tether retainers.
FIG. 13 is a perspective view showing a kit including an accessory storage unit and the ramp holder and showing that the ramp holder includes a first ramp anchor for a first loading ramp and a second ramp anchor for the second loading ramp and showing that each ramp anchor comprises a tailgate adapter, a tether, and a tether retainer.

Ramp holder 208 includes a pair of ramp anchors 205, 207 and an accessory storage unit 206 located between and coupled to each of ramp anchors 205, 207 as suggested in FIGS. 12 and 13. Each ramp anchor 205, 207 is configured to be coupled to tailgate 216 as shown, for example, in FIGS. 12, 14, and 15 and adapted to mate with one of the two loading ramps 214 to support loading ramps 214 in fixed inclined positions relative to vehicle tailgate 216 as suggested in FIG. 12.

In an illustrative embodiment, each of ramp anchors 205, 207 includes a tailgate adapter 212, a tether 200, and a tether retainer 220 as suggested in FIG. 13. Tailgate adapter 212 is configured to mate with tailgate 216 and with one end of a companion loading ramp 214 as suggested in FIGS. 12 and 15. Tether retainer 220 is configured to mate with tailgate 216 as suggested in FIGS. 12 and 15. Tether 200 illustratively includes a first strap 201 coupled to tether retainer 220, a second strap 202 coupled to tailgate adapter 212, and a strap connector 203 configured to interconnect first and second straps 201, 202 and to vary the length of tether 200 as needed.

Figure 15:
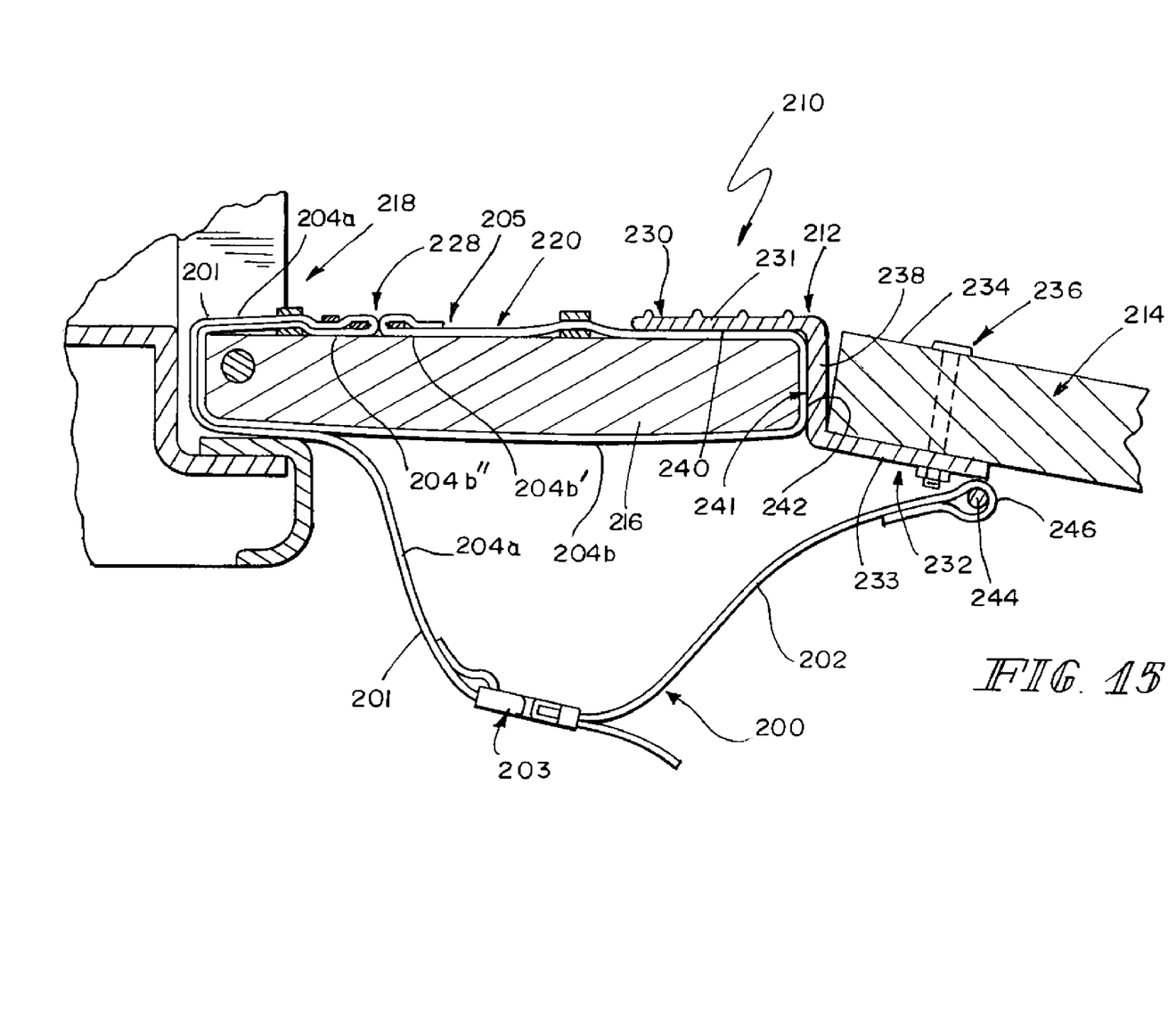
FIG. 15 is a cross-sectional view of FIG. 12 taken along line 15-15 of FIG. 12 showing a tether retainer positioned around the tailgate of the motor vehicle and also showing a tailgate mount of the tailgate adapter resting on the tailgate and a ramp support of the tailgate adapter coupled to a companion loading ramp and also showing a tether coupling the tailgate adapter to the tether retainer.

In an illustrative embodiment, a single cord 204 or the like is used to form portions of tether retainer 220 and first strap 201 of tether 200 as suggested, for example, in FIG. 15. Cord 204 includes a first segment 204a defining first strap 201 and a second segment 204b forming a loop around tailgate 216. A buckle 228 is also included in tether retainer 200 as suggested in FIG. 15 and is used to mate one end 204b' of second segment 204b to another end 204b" of second segment 204b at a "junction" between first and second segments 204a, 204b to hold tether retainer 220 in place on tailgate 216. It is within the scope of this disclosure to use any suitable means to couple first strap 201 of tether 200 to tether retainer 220.

In an illustrative embodiment, ramp adapter 212 includes a tailgate mount 230 adapted to lie on a portion of tailgate 216 when in use and a ramp support 232 coupled to tailgate mount 230 and adapted to be coupled to a first end 234 of loading ramp 214 by a coupling means, such as of fasteners 236, as shown, for example, in FIG. 15. Tailgate mount 230 includes a top plate 231 and a side plate 238 coupled to top plate 231 and arranged to lie at a right angle to top plate 231. Side plate 238 is coupled to ramp support 232. Top plate 231 includes an inside surface 240 that is adapted to be positioned against a top surface 243 of tailgate 216 as suggested in FIG. 12. Side plate 238 includes an inside surface 241 that is adapted to be positioned against an outer edge 242 of tailgate 216. Ramp support 232 includes a shelf 233 that extends outwardly from intermediate member 238 and cooperates to define an obtuse included angle therebetween as suggested in FIG. 15. Shelf 233 is configured to support and underlie one end of loading ramp 214 as suggested in FIG. 15. Ramp support 232 also includes a front plate 244 that is formed to include an aperture 246 that is adapted to accept second strap 202 to allow tailgate adapter 212 to be secured to tailgate 216 of motor vehicle 218.

Figure 14:
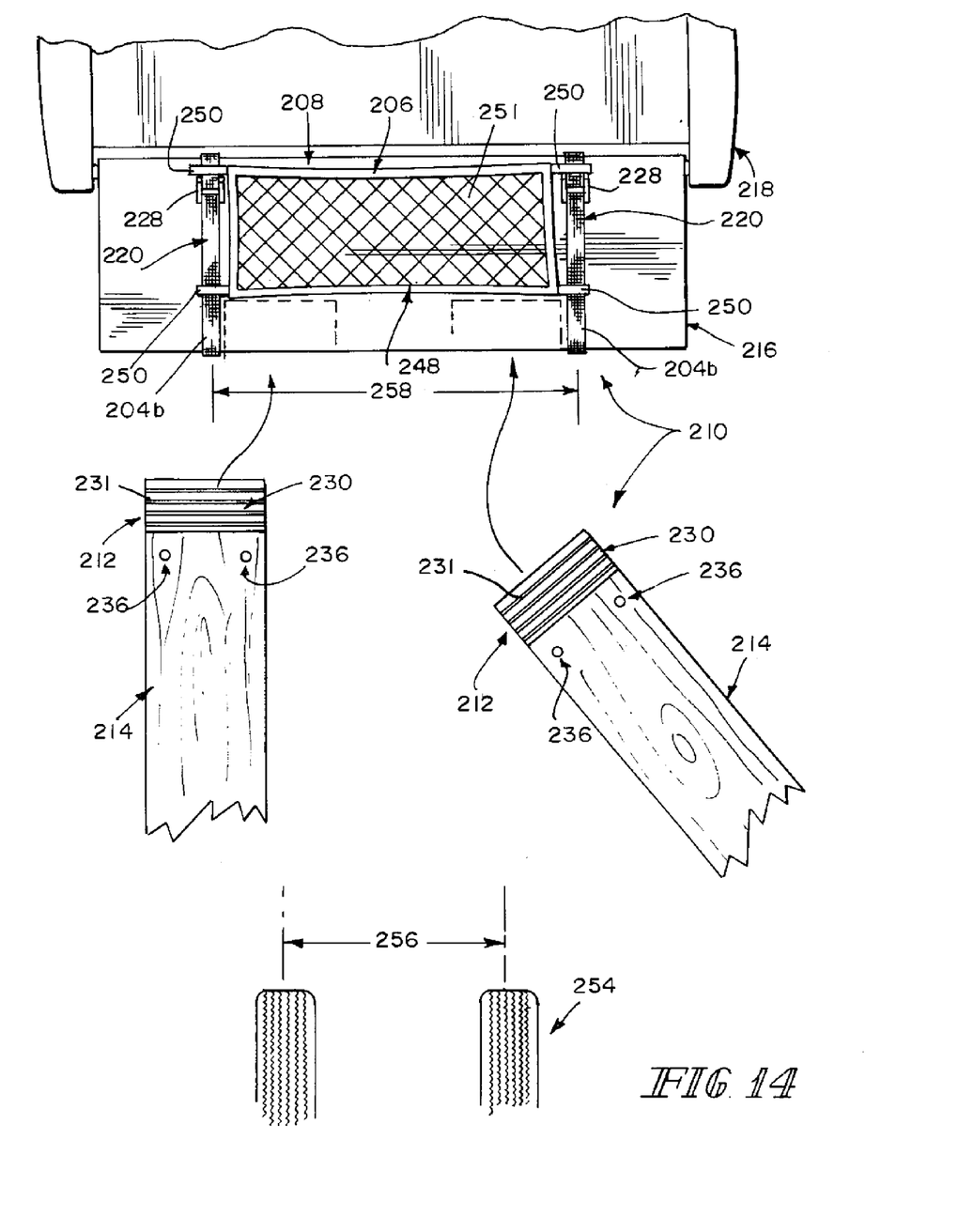
FIG. 14 is a top elevational view of the tailgate ramp system of FIG. 12 showing that the position of the tether retainers on the tailgate allows the user to know where to place the loading ramps properly with respect to each other so that the ramps are oriented properly for loading an ATV or tractor without requiring measuring.

If two tether retainers 220 are secured to tailgate 216 in a spaced-apart relationship, an accessory storage unit 248 can be positioned and retained between tether retainers 220 by use of retention straps 250, as shown, for example, in FIGS. 12 and 14. Retention straps 250 include fasteners 252 (e.g., hook-and-loop connectors) and are adapted to be coupled to tether retainers 220 and include a net bag 221 to create storage within the bed of pickup 218.

Tether retainers 220, when coupled to tailgate 216 at predetermined locations, can be used to set the width of ramp adapters 212 on tailgate 216, as shown, for example, in FIG. 14. Users of tailgate ramp system 210 are expected to reload the same piece of equipment multiple times into motor vehicle 218. By positioning tether retainers 220 properly, the user will always know where to position tailgate adapters 212 for a given vehicle. For an ATV 254 having a width 256, tether retainers 220 will be set on tailgate 216 at width 258. Setting tether retainers 220 at width 258 allows a user to position ramp adapters 212 so that ramp planks 214 are aligned properly to allow ATV 254 or other vehicle to be driven up ramp planks 214 and into motor vehicle 218.

Figure 16:
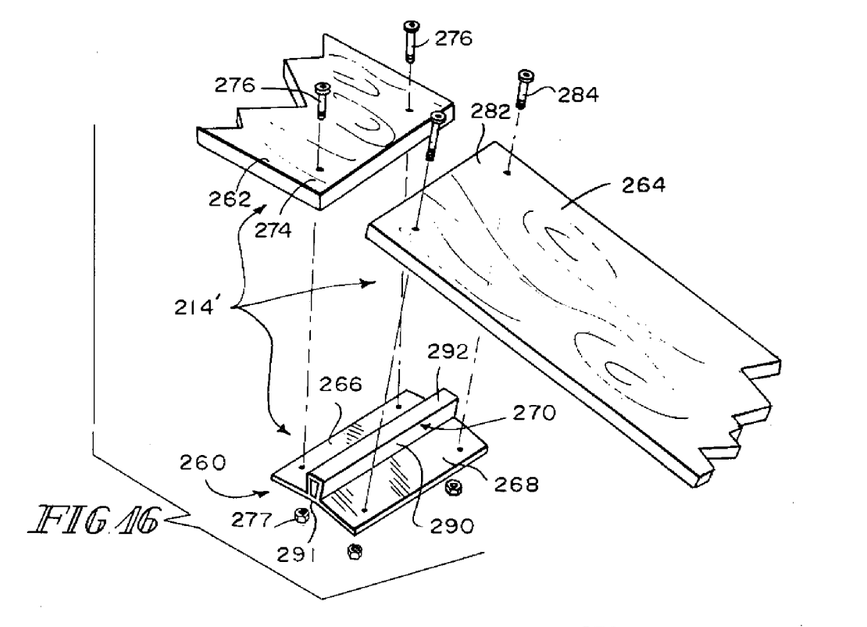
FIG. 16 is an exploded view of the mid-ramp adapter aligned to be coupled to an upper plank and a lower plank.
Figures 17, 18:
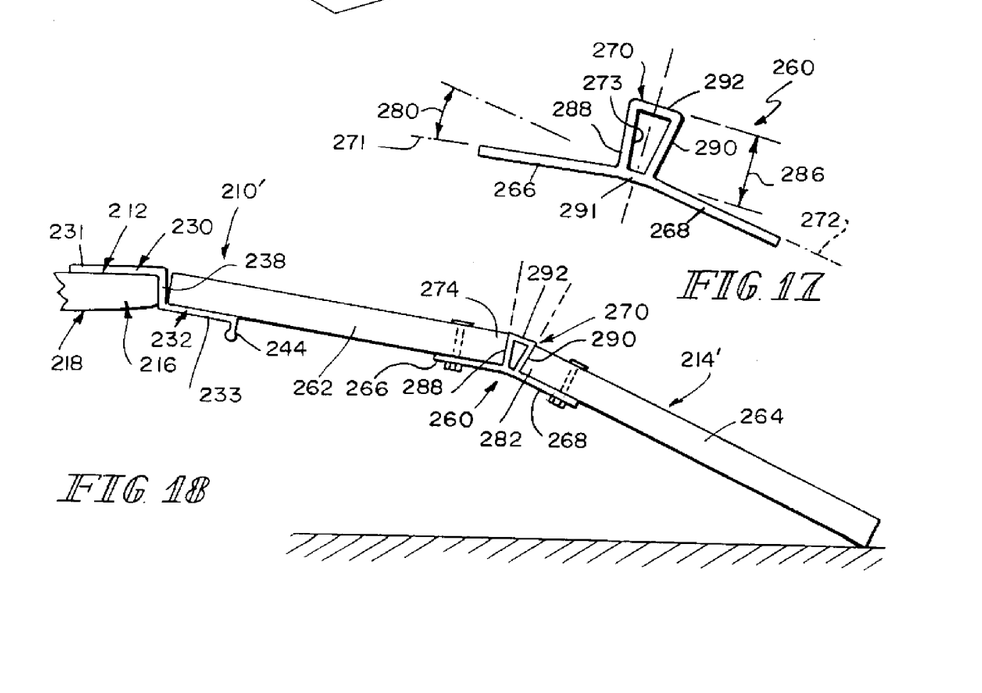
FIG. 17 is a side elevational view of the mid-ramp adapter showing a first plank support positioned at an angle to a second plank support and showing a plank separator having first and second walls interposed between, coupled to, and arranged to extend upwardly from the first and second plank supports.
FIG. 18 is a side elevational view of the mid-ramp adapter coupled to the first and second planks to create a loading ramp.

Another embodiment of mid-ramp adapter 260 is shown in the illustrative embodiments of FIGS. 16-18. Mid-ramp adapter 260 is used to join an upper plank 262 to a lower plank 264 to form an alternative loading ramp 214' and to create an angle between upper and lower planks 262, 264, as shown, for example, in FIG. 18. Mid-ramp adapter 260 includes a first plank support 266, a second plank support 268, and a plank separator 270 positioned between and coupled to first and second plank supports 266, 268. Loading ramp 214' can be used in lieu of loading ramp 214 illustrated in FIG. 12 to provide another tailgate ramp system 210' in accordance with the present disclosure.

First plank support 266 lies in a first plane 271 and is positioned to lie near and be coupled to a lower end 274 of upper plank 262 as suggested in FIGS. 16 and 18. First plank support 266 is coupled to upper plank 262 by a suitable fastener provided, for example, by bolts 276 and a mating nuts 277 as suggested in FIG. 16. Second plank support 268 of mid-ramp adapter 260 is arranged to lie in a second plane 272 that is at an angle 280 to first plane 271 of first plank support 266.

Second plank support 268 is positioned to lie near and be coupled to an upper end 282 of lower plank 264 as suggested in FIGS. 16 and 18. Second plank support 268 of mid-ramp adapter 260 is coupled to lower plank 264 by a suitable fastener provided, for example, by bolts 276 and nuts 277.

Mid-ramp adapter 260 also includes plank separator 270 positioned to lie between and interconnect first and second plank supports 266, 268. Plank separator 270 is adapted to lie between ends 274, 282 of upper and lower planks 262, 264 and has a height 286 (measured between walls 291 and 292) that is approximately the thickness of a standard 2×6 or 2×8 grade of lumber. Plank separator 270 includes a first side wall 288, a spaced-apart second side wall 290, a bridge wall 291, and a ramp wall 292. In an illustrative embodiment, mid-ramp adapter 260 is a monolithic extrusion and bridge wall 291 interconnects first and second plank supports 266, 268 as suggested in FIG. 17. Plank separator 270 has a trapezoid-shaped cross-section in the embodiment shown in FIG. 17 and ramp wall 292 is wider than bridge wall 291.

First side wall 288 is adapted to lie near lower end 274 of upper plank 262. First side wall 288 is substantially perpendicular to first plank support 266 as suggested in FIG. 17 to allow both first plank support 266 and first side wall 288 to engage upper plank 262 to provide support when a load is placed on upper plank 262.

Second side wall 290 is spaced apart from first side wall 288 and is adapted to lie near upper end 282 of lower plank 264. Second side wall 290 is substantially perpendicular to second plank support 268 as suggested in FIG. 17 to allow both second plank support 268 and second side wall 290 to engage lower plank 264 to provide support when a load is placed on lower plank 264.

Ramp wall 292 of plank separator 270 is located between and coupled to upper ends of first and second side walls 288, 290 as shown, for example, in FIG. 18. Ramp wall 292 creates a transition surface and a "roadway" between upper and lower planks 262, 264 to fill in a gap created by the angle between ends 274, 282 of planks 262, 264 when coupled to first and second plank supports 266, 268. Plank separator 270 also includes a bridge wall 291 located between and coupled to lower ends of first and second side walls 288, 290. Plank separator 270 is also formed to include a hollow chamber 273 that is bounded by bridge wall 271, side walls 288, 290, and ramp wall 292. Plank separator 270 is trapezoid shaped, which shape allows plank separator 270 to fill in a void between upper and lower planks 262, 264. First side wall 288 is set apart from second side wall 290, for example, at an angle 275 that is approximately 15-20 degrees. This included angle between walls 288 and 290 depends upon the degree of slope desired on inclined upper plank 262.

Alternatively, mid-ramp adapter 260 may include a third plank support (not shown) that would overlie first plank support 266 to sandwich upper plank portion 262 between plank supports to provide additional support. Mid-ramp adapter 260 may also include a fourth plank support (not shown) that would overlie second plank support 268 to sandwich lower plank portion 264 between plank supports to provide additional support. Such an arrangement would be similar to FIGS. 5 and 6 but would include first and second wall portions 288, 290, ramp wall 292, and bridge wall 271 in place of wall member 116.

When mid-ramp adapter 260 is coupled to upper and lower planks 262, 264 and upper plank 262 is positioned on tailgate 216 of motor vehicle 218, the transition angle between upper plank 262 and tailgate 216 is less than the transition angle between lower plank 264 and tailgate 216 so that vehicles being driven up the ramp will not bottom out on the transition between upper plank 262 and tailgate 216.

The invention claimed is:

1. A tailgate ramp system for use with a loading ramp to span the distance between a ground level surface and a tailgate of a motor vehicle, the tailgate ramp system comprising
   a tether retainer adapted to be coupled to the tailgate of the motor vehicle,
   a tailgate adapter having a tailgate mount adapted to lie on a portion of the tailgate and a ramp support adapted to be coupled to one end of the loading ramp and to the tailgate mount, and
   a tether having a first strap coupled to the tether retainer, a second strap coupled to the tailgate adapter, and a strap connector coupled to the first and second straps.

2. The tailgate ramp system of claim 1, wherein the tether retainer includes a strap that is adapted to be positioned around the tailgate of the motor vehicle.

3. The tailgate ramp system of claim 2, wherein the strap is secured by a strap connector that is used to secure the tether retainer to the tailgate of the motor vehicle.

4. The tailgate ramp system of claim 1, wherein the tailgate mount includes a top plate and a side plate coupled to the top plate.

5. The tailgate ramp system of claim 4, wherein the side plate is coupled to the ramp support.

6. The tailgate ramp system of claim 5, wherein the ramp support extends outwardly from the side plate and cooperates to define an obtuse included angle therebetween.

7. The tailgate ramp system of claim 6, wherein the ramp support is formed to include an aperture that is adapted to accept the second strap to secure the tailgate adapter to the tailgate of the motor vehicle.

8. The tailgate ramp system of claim 1, further including a second tether retainer adapted to be coupled to the tailgate of the motor vehicle.

9. The tailgate ramp system of claim 8, further including a second tailgate adapter having a tailgate mount adapted to lie on a portion of the tailgate and a ramp support adapted to be coupled to one end of a second loading ramp and to the tailgate mount of the second tailgate adapter.

10. The tailgate ramp system of claim 9, further including a second tether having a first strap coupled to the second tether retainer, a second strap coupled to the second tailgate adapter, and a strap connector coupled to the first and second straps of the second tether.

11. The tailgate ramp system of claim 9, further including a cargo container secured between the first and second tether retainers.

12. A tailgate ramp system for use with loading ramps to span the distance between a ground level surface and a tailgate of a motor vehicle, the tailgate ramp system comprising
   first and second tether retainers each adapted to be coupled to the tailgate of the motor vehicle,
   first and second tailgate adapters each having a tailgate mount adapted to lie on a portion of the tailgate and a ramp support adapted to be coupled to one end of the loading ramps, and
   first and second tethers each having a first strap coupled to one of the tether retainers, a second strap coupled to one of the tailgate adapters, and strap connectors coupled to the first and second straps of the first and second tethers.

13. The tailgate ramp system of claim 12, wherein the tailgate adapters each include a top plate and a side plate coupled to the top plate.

14. The tailgate ramp system of claim 13, wherein each of the side plates of the tailgate adapters are coupled to the respective ramp supports.

15. The tailgate ramp system of claim 14, wherein the ramp support of each tailgate adapter extends outwardly from the respective side plate and cooperates to define an obtuse included angle therebetween.

16. The tailgate ramp system of claim 15, wherein each ramp support is formed to include an aperture that is adapted to accept one of the second straps of the first and second tethers to secure the tailgate adapters to the tailgate of the motor vehicle.

17. The tailgate ramp system of claim 13, wherein the straps of the tether retainers each are secured by use of a strap connector that is used to secure the tether retainers to the tailgate of the motor vehicle.

18. The tailgate ramp system of claim 12, wherein each tether retainer includes a strap that is adapted to be positioned around the tailgate of the motor vehicle.

19. A tailgate ramp system for use with a loading ramp to span the distance between a ground level surface and a tailgate of a motor vehicle, the tailgate ramp system comprising
   a tether retainer adapted to be coupled to the tailgate of the motor vehicle,
   a tailgate adapter having a tailgate mount adapted to lie on a portion of the tailgate and a ramp support adapted to be coupled to one end of the loading ramp and to the tailgate mount, and
   a tether adapted to be coupled to the tether retainer and the tailgate adapter to secure the tailgate adapter to the tailgate of the motor vehicle.

20. The tailgate ramp system of claim 19, including an accessory storage unit positioned and retained by the tether retainer.

21. The tailgate ramp system of claim 19, wherein the accessory storage unit comprises a net bag.

22. The tailgate ramp system of claim 19, wherein the tether comprises a cord and a buckle.

23. The tailgate ramp system of claim 22, wherein the cord includes a first segment defining first strap and a second segment forming a loop around the tailgate.

24. The tailgate ramp system of claim 23, wherein the buckle is used to mate one end of the second segment to another end of the second segment at a junction between the first and second segments to hold the tether retainer in place on the tailgate.

* * * * *